United States Patent
Hoff

(10) Patent No.: US 8,375,365 B2
(45) Date of Patent: Feb. 12, 2013

(54) CUSTOMIZATION VERIFICATION

(75) Inventor: Roland Hoff, Walldorf (DE)

(73) Assignee: SAP AG, Walldorf (DE)

( * ) Notice: Subject to any disclaimer, the term of this patent is extended or adjusted under 35 U.S.C. 154(b) by 1076 days.

(21) Appl. No.: 12/343,163

(22) Filed: Dec. 23, 2008

(65) Prior Publication Data

US 2010/0162214 A1  Jun. 24, 2010

(51) Int. Cl.
  *G06F 9/44* (2006.01)
  *G06F 11/34* (2006.01)
  *G06F 11/36* (2006.01)
(52) U.S. Cl. ............... 717/124; 717/126; 714/37
(58) Field of Classification Search ........... 717/100, 717/126
  See application file for complete search history.

(56) References Cited

U.S. PATENT DOCUMENTS

| | | | |
|---|---|---|---|
| 5,754,858 A * | 5/1998 | Broman et al. ............ | 717/111 |
| 5,963,910 A | 10/1999 | Ulwick | |
| 6,871,232 B2 | 3/2005 | Curie et al. | |
| 6,889,222 B1 | 5/2005 | Zhao | |
| 7,117,172 B1 | 10/2006 | Black | |
| 7,139,798 B2 | 11/2006 | Zircher et al. | |
| 7,366,460 B2 | 4/2008 | O'Farrell et al. | |
| 7,430,410 B2 | 9/2008 | Iwatsu et al. | |
| 7,546,359 B2 | 6/2009 | Tierney et al. | |
| 2002/0052812 A1 | 5/2002 | Braverman | |
| 2002/0055956 A1 | 5/2002 | Krasnoiarov et al. | |
| 2002/0133392 A1 | 9/2002 | Angel et al. | |
| 2002/0152210 A1 | 10/2002 | Johnson et al. | |
| 2002/0156812 A1 | 10/2002 | Krasnoiarov et al. | |
| 2002/0161788 A1 | 10/2002 | McDonald | |
| 2003/0009536 A1 | 1/2003 | Henderson et al. | |
| 2004/0093397 A1 | 5/2004 | Chiroglazov et al. | |
| 2004/0215504 A1 | 10/2004 | Ikezawa | |
| 2005/0060371 A1 | 3/2005 | Cohen et al. | |
| 2005/0108041 A1 | 5/2005 | White | |
| 2006/0075024 A1 | 4/2006 | Zircher et al. | |
| 2006/0095476 A1 | 5/2006 | Dauer et al. | |
| 2006/0294158 A1 * | 12/2006 | Tsyganskiy et al. ......... | 707/202 |
| 2007/0226031 A1 | 9/2007 | Manson et al. | |
| 2007/0226032 A1 | 9/2007 | White et al. | |
| 2007/0282650 A1 | 12/2007 | Jackness et al. | |
| 2007/0283287 A1 | 12/2007 | Taylor et al. | |
| 2008/0195429 A1 | 8/2008 | Hoff | |
| 2008/0301645 A1 | 12/2008 | Hoff et al. | |

(Continued)

FOREIGN PATENT DOCUMENTS

| | | |
|---|---|---|
| EP | 1571541 A2 | 9/2005 |
| EP | 1635287 A1 | 3/2006 |

OTHER PUBLICATIONS

U.S. Appl. No. 11/809,513, filed Jun. 1, 2007, 31 pages.

(Continued)

*Primary Examiner* — Li B Zhen
*Assistant Examiner* — Joanne Macasiano
(74) *Attorney, Agent, or Firm* — Brake Hughes Bellermann LLP

(57) ABSTRACT

Results of an execution of a function including customizable steps, may be verified. Multiple of steps of the function, may be determined and may the customizable steps that have been customized. Results may be determined based on an execution of the function, wherein the execution uses values provided as inputs to the function. A result view for verifying the one or more results may be provided, the result view may include the steps of the function, the values corresponding to the inputs, and the results.

18 Claims, 5 Drawing Sheets

U.S. PATENT DOCUMENTS

2008/0319777 A1    12/2008    Hoff
2009/0037195 A1     2/2009    Hoff
2009/0307653 A1    12/2009    Hoff

OTHER PUBLICATIONS

Non-Final Office Action for U.S. Appl. No. 11/590,217, mailed Jun. 10, 2009, 16 pages.
Final Office Action for U.S. Appl. No. 11/590,217, mailed Jan. 7, 2010, 22 pages.
Non-Final Office Action for U.S. Appl. No. 11/820,701, mailed Jun. 13, 2011, 10 pages.
Non-Final Office Action for U.S. Appl. No. 11/820,701, mailed Aug. 19, 2010, 15 pages.
Final Office Action for U.S. Appl. No. 11/820,701, mailed Feb. 18, 2011, 18 pages.
Non-Final Office Action for U.S. Appl. No. 11/820,701, mailed Apr. 17, 2012, 24 pages.
Non-Final Office Action Response for U.S. Appl. No. 11/820,701, filed Sep. 13, 2011, 8 pages.
U.S. Appl. No. 11/830,911, filed Jul. 31, 2007, 29 pages.
U.S. Appl. No. 12/135,100, filed Jun. 6, 2008, 31 pages.
U.S. Appl. No. 12/343,163, filed Dec. 23, 2008, 26 pages.
U.S. Appl. No. 12/347,720, filed Dec. 31, 2008, 29 pages.
Office Action for EP Application No. 07020243.7 mailed Feb. 20, 2009, 9 pages.
Office Action for EP Application No. 04020243.7, mailed Oct. 16, 2009, 7 pages.

* cited by examiner

CUSTOMIZATION VERIFICATION

TECHNICAL FIELD

This description relates to the evaluation of results of customizations to a software application.

BACKGROUND

As different users of an application may have different needs, flexible software packages may be customized to meet the needs of many different users. However, the more a standard software package or application is customized by a particular user, the greater the likelihood that the customizations may result in unexpected output when executed by the software application. For example, an application with 100 customization steps may have a greater likelihood of generating unexpected output versus an application with only 10 customization steps.

Additionally, the more an application is customized, the more difficult it may be for a consultant, developer or other user or support personnel (hereinafter, referred to as developer) to determine where or which customization step may be responsible for generating the unexpected output. Thus, more customizations may result in a greater number of customization steps that a developer needs to parse through to determine the source of the unexpected output.

For example, the application, as a result of the customizations, may output one or more documents. Then, for example, a developer or other user may determine that there is unexpected output in one or more of the documents. At that point it may be difficult and time-intensive for a developer to try and determine precisely which customization step was responsible for producing the unexpected output, especially in the case of a large number of customization steps.

SUMMARY

According to an example embodiment, computer system including instructions stored on a computer-readable medium is provided. A selector may be configured to receive a selection of a function, wherein an execution of the function yields one or more results for verification. An input handler may be configured to receive values corresponding to one or more inputs to the function. A step engine may be configured to determine a plurality of steps associated with an execution of the function. An execution engine may be configured to execute the function, including the plurality of steps, based on the values provided as the one or more inputs. A view generator may be configured to provide the plurality of steps of the function in association with the values and one or more results of the execution for the verification.

According to an example embodiment, a method for verifying results of an execution of a function, wherein the function includes one or more customizable steps is provided. A plurality of steps of a function may be determined, the plurality of steps including one or more customizable steps that have been customized. One or more results may be determined based on an execution of the function, wherein the execution uses values provided as one or more inputs associated with the function. A result view for verifying the one or more results may be provided, the result view including the plurality of steps of the function, the values corresponding to the inputs, and the one or more results.

According to an example embodiment, machine executable instructions stored on a computer-readable medium that, when executed on a data processing apparatus, are configured to cause the data processing apparatus to provide an interface with multiple views is provided. A selection view may comprise a selection field configured to receive a selection of a function of an application, wherein the function has been customized and an execution of the function is configured to yield one or more results for verification, and one or more input fields corresponding to one or more inputs of the selected function and configured to receive values for the one or more inputs. A result view may comprise selectable links for one or more steps of the function, including the customization, value fields including the values corresponding to the one or more inputs, and the one or more results of the execution of the function with the values provided as the one or more inputs for verification. A maintenance view, provided upon a selection of one of the selectable links, may be configured to allow for customization of the function and including the one or more steps and the values based on the verification.

The details of one or more implementations are set forth in the accompanying drawings and the description below. Other features will be apparent from the description and drawings, and from the claims.

DETAILED DESCRIPTION

Figure 1:
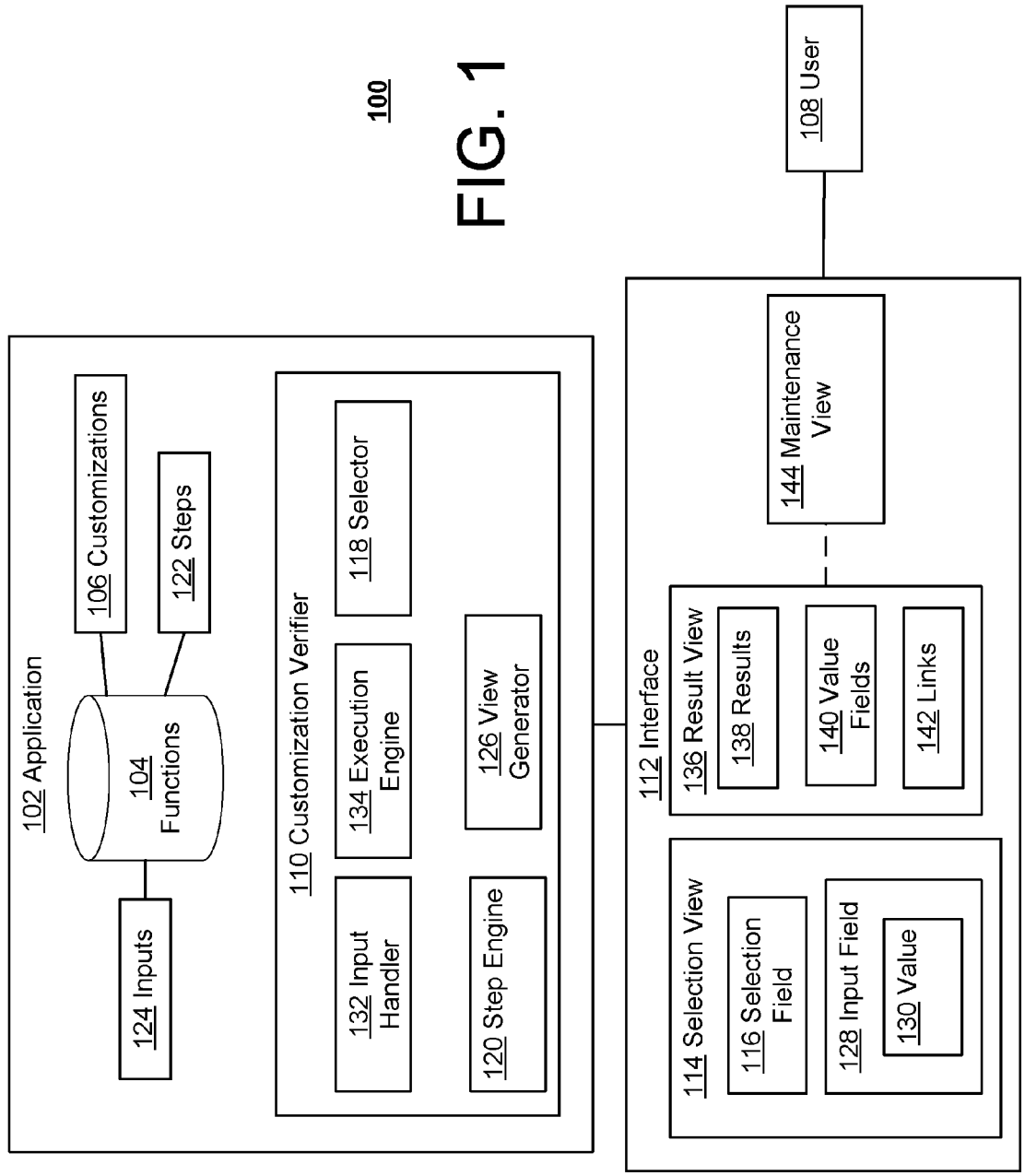
FIG. 1 is a block diagram of an example system for verifying results of customizations to an application, according to an example embodiment.

FIG. 1 is a block diagram of an example system 100 for verifying results of customizations to an application, according to an example embodiment. In the example of FIG. 1, the system 100 may allow a user to verify output produced by modifications or customizations to the application. The system 100 may allow the user to verify only a portion of the customizations to an application, even if all the customizations for a particular functionality of the application have not yet been completed.

For example, upon performing a customization to a particular functionality of the application, the system 100 may simulate or otherwise execute the customized functionality of the application and provide results from the execution to a user to verify the results. If the customized, or partially customized, functionality expects inputs to be provided that have not yet been defined or customized, the system 100 may prompt or otherwise provide the user an opportunity to provide the values for the expected inputs. The system 100 may then execute the application, or customized portion thereof, with the provided values and provide results to the user. The user may then view the results provided by the system 100 and determine whether the customized functionality produced any unexpected results, address the customizations producing the unexpected results and perform further customizations.

The system 100 may allow a user to quickly identify errors or unexpected results occurring during a customization of the application. This may allow the user to catch and correct customization errors early in the customization life-cycle process, which may prevent compounding errors with later customizations that would make it more difficult to identify the source of the errors. This may save time and money to not only the user customizing the application, but also the customer who uses the customized application (who will be less likely to encounter errors) and a provider of the standard application (to whom the customized errors may accidentally be attributed). The system 100 may have the added advantage of allowing the user to change the inputs to the execution and test several variations of inputs to more quickly identify any potential problem areas of customization.

The system 100 may include an application 102. The application 102 may include any application with one or more built-in, customizable functions 104. According to an example embodiment, the application 102 may include a customer relationship management (CRM) or enterprise resource planning (ERP) application that includes customizable base functionality that may be customized or otherwise modified to suit a user's needs, including generating reports or other documents as specified by the user. Of course, virtually any other customizable software application is contemplated, as well.

The application 102 may include one or more functions 104. A function 104 may include any functionality performed by the application 102. The functions 104 may be customizable to meet a particular client's needs and/or preferences. A function 104 may include for example, a container, library or other storage, and/or a reference executable code for, one or more processes of the application 102. Then for example, a user 108 may customize (e.g., via one or more customizations 106) one or more of the functions to meet a particular set of needs or preferences. Example functions 104 may include, but not be limited to, resource management, human resource, tax planning, and sales life cycle functions.

The customizations 106 may include any values or entries provided by the user 108 to customize or modify the functions 104 to meet requirements or preferences. For example, the customizations 106 may include an entry as to the location of a data source that a function 104 accesses to perform a calculation. Or, for example, the customizations 106 may include program code, algorithms or other modifications to one or more of the functions 104.

For example, a customization 106 to a human resource function 104 designed to provide a roster of employees and consultants working for a client may include providing a location of a server or employee database where such information may be stored and imported into and/or otherwise used or accessed by the application 102. Then for example, during an execution of the human resource function 104, the application 102 may retrieve one or more values from the identified database (e.g., customization 106). The customizations 106, however, may include any modifications or customizations to the functions 104 and may include, for example, customizations based on a client's industry, operations, size, customer base, capital structure or other attributes or preferences of the client.

The user 108 may include any person or system that customizes and/or verifies the customizations 106 to the application 102, or otherwise uses the system 100. For example, the user 108 may include a consultant, engineer, employee, developer or other user who implements the customizations 106 on behalf of a customer or client to the application 102. Then for example, the user 108 may verify the functionality of the customizations 106 using the system 100.

The system 100 may include a customization verifier 110. The customization verifier 110 may trace and/or simulate an execution of at least a portion of the application 102. For example, as referenced above, the user 108 may verify the product of one or more customizations 106 performed on the application 102. The user 108 may, for example, select which function(s) 104 of the application 102 for which results are to be verified, and the customization verifier 110 may simulate or otherwise execute the selected functions 104, including the provided or applied customizations 106, and provide results of the execution to the user 108 for verification.

According to an example embodiment, the user 108 may interface with the customization verifier 110 via an interface 112. The interface 112 may include any interface adapted to provide information to and receive information from the user 108. The interface 112 may include, for example, a graphical user interface (GUI). The interface 112 may include multiple views that allow the user 108 to interact with the system 100, including the customization verifier 110. The views (e.g., selection view 114, result view 136 and maintenance view 144) may include windows, panels or other portions of the interface 112 configured to provide and/or receive information associated with verifying the results of the customizations 106. The views will be discussed in greater detail below.

The selection view 114 may allow a user to provide information to the customization verifier 110. The selection view 114 may include a selection field 116 configured to receive a selection of one or more of the functions 104 to be tested for verification, as discussed above. For example, the selection view 114 may include a list of the functions 104, or customized functions, of the application 102 that the user 108 may select from. As will be discussed below, there are other ways in which the user 108 may select function(s) 104 for verification (e.g., by the customization verifier 110).

A selector 118 may receive the user's 108 selections of one or more of the customizable functions 104 for which results are to be verified. For example, the selector 118 may receive the selected functions (e.g., 104) provided via the selection field 116 of the selection view 114. As will be discussed below, the system 100 may allow other methods of selecting functions 104 of the application 102 for verification as well, in which case, those selections may also be received by the selector 118.

A step engine 120 may determine one or more steps 122 associated with the selected functions 104. For example, a function 104 may include one or more steps 122 that may be performed during an execution of the function 104. The steps 122 may include one or more actions, calculations or other processing or data manipulation. An example first step 122 may include retrieving a current employee roster, and an example second step 122 may include narrowing the roster to those employees who have worked at a company for more than five years. The step engine 120 may, for example, parse the selected functions 104 or otherwise determine the steps 122 included in each selected function 104.

The step engine 120 may determine inputs 124 associated with the selected functions 104. For example, a function 104 may include inputs 124 that may be expected or utilized during an execution of the function 104. The inputs 124 may include any placeholder or variable in the functions 104, including the customizations 106, that receives, retrieves or otherwise inputs one or more values from a data source such as the user 108, a database or other system. According to an example embodiment, the step engine 120 may determine the inputs 124 associated with the steps 122 of the function 104.

A view generator 126 may populate the selection view 114 with one or more input fields 128 for the inputs 124. The view generator 126 may provide to the interface 112 the views (e.g., selection view 114, result view 136 and maintenance view 144) of the system 100. For example, the view generator 126 may populate the selection view 114 with the input fields 128.

The input fields 128 may receive one or more values 130 to be used as the inputs 124. For example, the input fields 128 may include text boxes, drop down lists or other interface components allowing the user 108 to provide the values 130. According to an example embodiment, the selection view 114 may prompt the user 108 to enter values 130 into the input fields 128. The values 130 may include any alpha-numeric text, pointer or other values provided as inputs 124. For example, the value 130 may include an address to a server containing the sought input 124 information.

An input handler 132 may receive the values 130 provided via the input fields 128. The input handler 132 may, for example, receive or otherwise retrieve the values 130 from the selection view 114 and store them in a buffer or otherwise provide them to other portions of the customization verifier 110. For example, the input handler 132 may provide the values 130 to an execution engine 134.

The execution engine 134 may execute, or otherwise simulate an execution of selected functions 104. The execution engine 134 may execute the selected functions 104, using the values 130 as the inputs 124. The execution engine 134 may, for example, perform or execute each of the steps 122, substituting the values 130 for the inputs 124, and storing any intermediate results that are computed during the execution. The execution engine 134 may then provide the results, both intermediate and final, from the execution to the view generator 126.

The view generator 126 may populate, or otherwise provide a result view 136, including results 138. The result view 136 may provide a user with the results 138 from an execution (or simulation) of selected functions 104. The results 138 may include intermediate and/or final results from the execution. An intermediate result may include a computation or other process performed during the execution of a function that is not provided to an end-user. For example, an applied sales tax computation may include an intermediate result 138 in a function 104 that only outputs the total cost of a product or service, whereby the total cost may be an example of a final result 138.

A final result 138 may include any information output from the execution of the selected functions 104. The final result 138 may not necessarily be output for use by the user 108 or client (or may in other circumstances), but may be determined for use in another system, process or function (e.g., 104), or may include the end product of the execution of the function 104. Providing both intermediate and final results 138 may allow the user 108 to determine where an unexpected result may have been computed, and more quickly identify and address any problems with the customizations 106 that may exist.

The result view 136 may include value fields 140. The value fields 140 may include the values 130 received or otherwise determined for the execution of the selected functions 104. The value fields 140 may include user provided inputs to the input field 128 and/or other values 130 determined during the execution, for example, as retrieved from another process, database or other system.

According to an example embodiment, the user 108 may edit the value (e.g., 130) provided in the value field 140 and re-execute the selected functions 104 (and/or may choose any other combination of functions 104 to execute). This may allow the user 108 to analyze and/or verify the results 138 against the values 130 input for the execution. The user 108 may, for example, change one or more of the values 130 in the value fields 140 and re-execute the selected functions 104 with the new values. Then for example, the user 108 may compare the old results 138 with the new results 138 to identify which, if any, customizations 106 may be causing an unexpected result.

The result view 136, including the elements displayed therein, may be organized any different number of ways. For example, the result view 136 may be displayed in a chronological format based on the steps 122, wherein a first executed step 122 may be displayed in conjunction with the value field 140 and/or intermediate results 138 associated with the first executed step 122, followed by a second, third, etc. until the final result 138 is reached. In other example embodiments, other formatting and/or displays may be used.

The result view 136 may include one or more links 142. The links 142 may include hyperlinks, pointers or other references to the customizations 106 that correspond to the displayed elements of the result view 136. For example, the user 108 may select or click on a link 142 of an intermediate result 138, and the user 138 may be directed to the portion of the customizations 106 executed to produce that intermediate result 138. According to an example embodiment, a selection of a link 142 may cause the view generator 126 to provide a maintenance view 144.

The maintenance view 144 may include provide at least a portion of the customizations 106 or other portions of the functions 104 associated with one or more elements or objects displayed in the result view 136 as discussed above. The maintenance view 126, further, may allow the user 108 to modify the customizations 106, inputs 124 and/or values 130 such that upon a subsequent execution of the selected function 104, the results 138 may change. According to an example embodiment, the user 108 may cause a subsequent execution of a selection of the functions 104 from the maintenance view 144, for example by pressing a button or selecting a menu item.

The maintenance view 126 may be provided as part of, or separate from, a customization verifier 110. The customization verifier 110 may be used to set and/or modify the customizations 106 for the application 102. For example, the customization verifier 110 may include an editing program or compiler that allows for the modification of the customizations 106 or other program code associated with the application 102. The customization verifier 110 may include a built-in functionality of the application 102, or may be separate from the application 102 but may still allow for a modification of the customizations 106.

According to another example embodiment, the maintenance view 144 may be displayed in association with one or more result views 136. Displaying multiple result views 136 in the interface 112 may allow the user 108 to easily compare the results from a first execution of the functions 104 to a second execution. Displaying the maintenance view 144 in association with one or more result views 136 may allow the user 108 to quickly and easily modify the customizations 106 and see the results 138 of a subsequent execution of the modified customizations 106.

The system 100 may allow a user to verify output as results of customizations to one or more functions of an application. Using multiple views, as provided an interface, the user can view intermediate and final results from an execution of the customized functions, provide or change input values, modify the customizations and re-execute the modified application. This may allow the user to save time, energy and money when customizing one or more aspects of a system.

Figure 2:
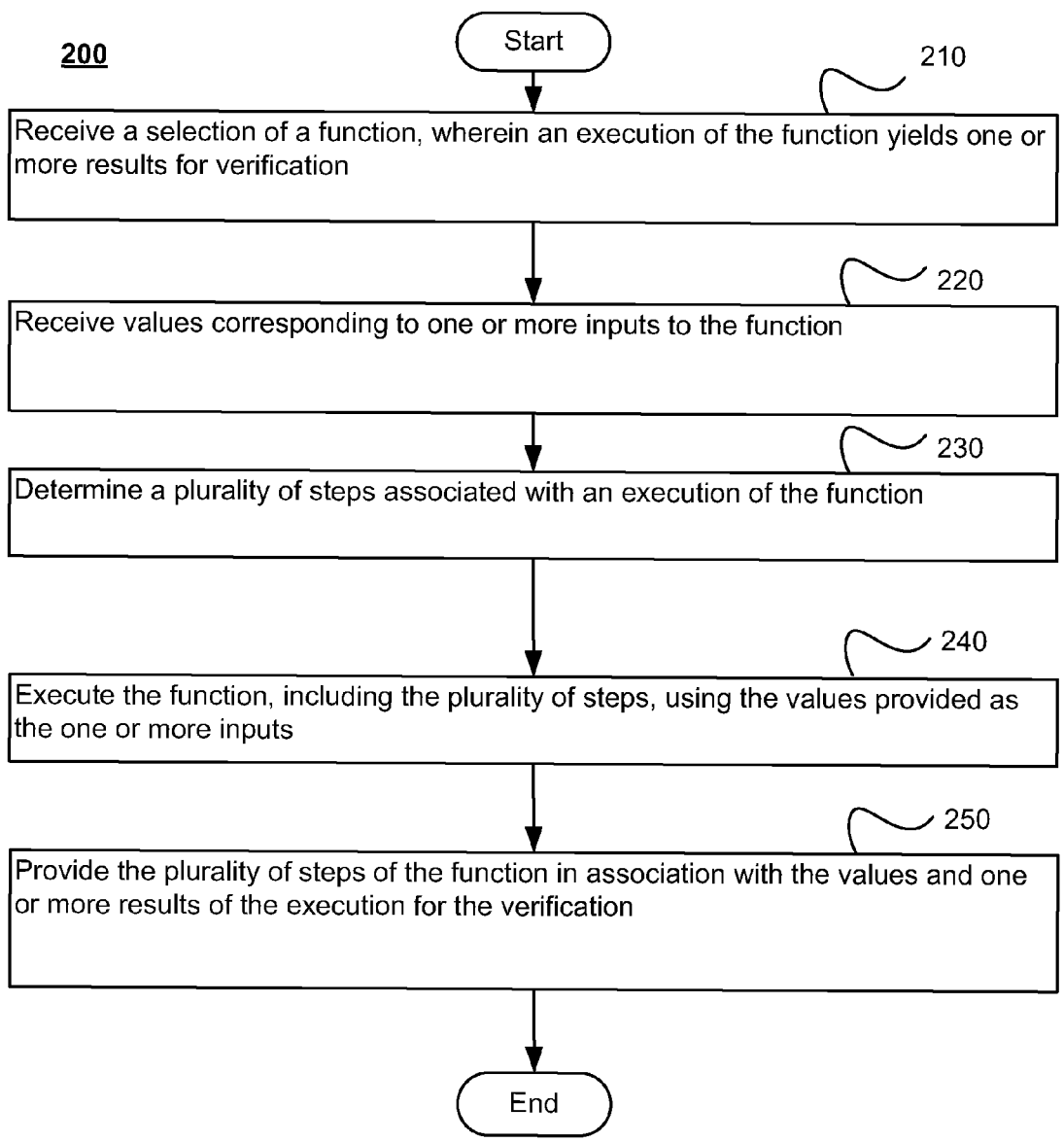
FIG. 2 is a flowchart illustrating example operations of the system of FIG. 1.

FIG. 2 is a flowchart 200 illustrating example operations of the system of FIG. 1. More specifically, FIG. 2 illustrates an operational flow 200 representing example operations related to customization verification.

After a start operation, a selection of a function may be received, wherein an execution of the function yields one or more results for verification (210). For example, as shown in FIG. 1, the selector 118 may receive a selection of a function 104 from the selection field 116. An execution of the selected function 104 may yield the results 138 for verification.

Values corresponding to one or more inputs to the function may be received (220). For example, values 130 may be received via input fields 128 for the inputs 124 to the functions 104.

A plurality of steps associated with an execution of the function may be determined (230). For example, the step engine 120 may determine the steps 122 associated with an execution of the function 104.

The function, including the plurality of steps, may be executed using the values provided as the one or more inputs (240). For example, the execution engine 134 may execute the function 104 using the values 130 provided as the inputs 124 (e.g., via the input fields 128).

The plurality of steps of the function may be provided in association with the values and one or more results of the execution for the verification (250). For example, the view generator 126 may provide the result view 136 via the interface 112. The result view 136 may include the steps 122 of the function 104 provided in association with the value fields 140 and the results 138 of the execution of the verification.

Figure 3:
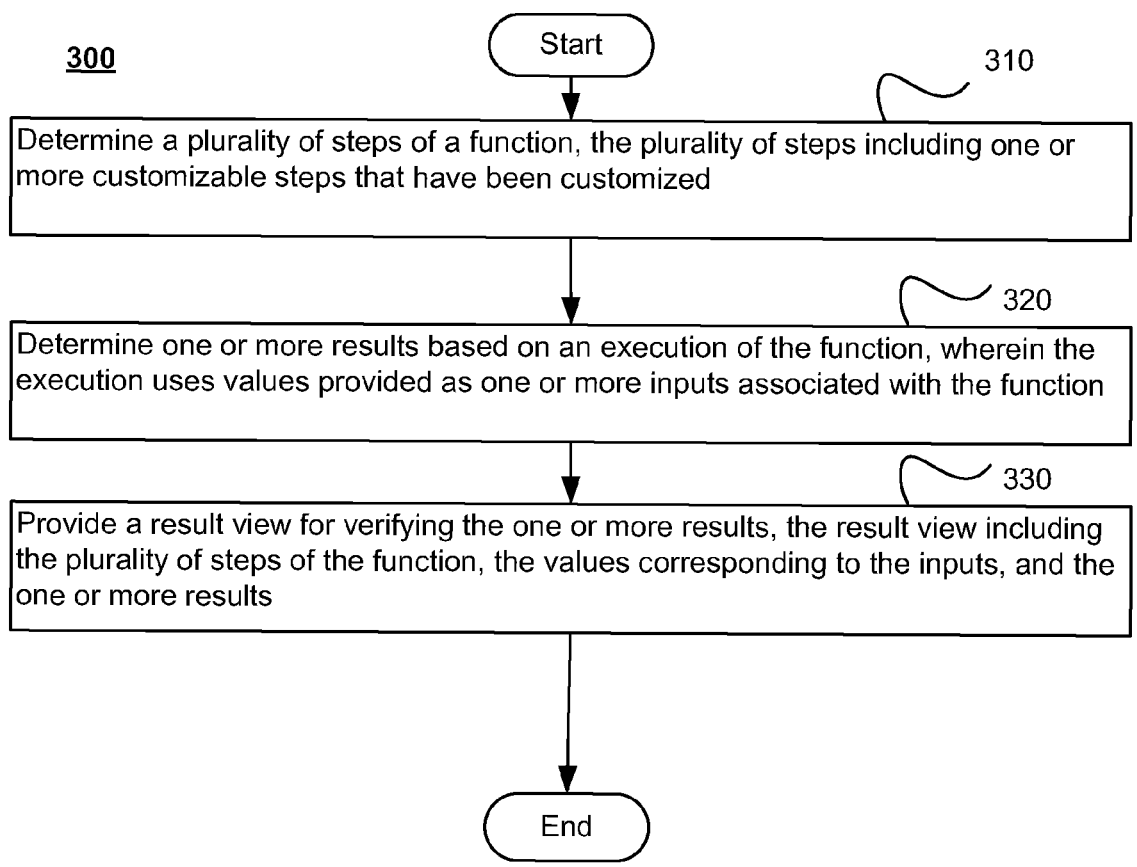
FIG. 3 is a flowchart illustrating example operations of the system of FIG. 1.

FIG. 3 is a flowchart 300 illustrating example operations of the system of FIG. 1. More specifically, FIG. 3 illustrates an operational flow 300 representing example operations related to customization verification.

After a start operation, a plurality of steps of a function may be determined, the plurality of steps including one or more customizable steps that have been customized (310). For example, as shown in FIG. 1, the step engine 120 may determine the steps 122 of the function 104 that have been customized with the customizations 106.

One or more results based on an execution of the function may be determined, wherein the execution uses values provided as one or more inputs associated with the function (320). For example, the execution engine 134 may determine the results 138 of an execution of the function 104, wherein the values 130 are used as the inputs 124 of the function 104.

A result view for verifying the one or more results may be provided, the result view including the plurality of steps of the function, the values corresponding to the inputs, and the one or more results (330). For example, the view generator 126 may provide the result view 136 for verifying the results 138, the result view 136 may include the steps 122 of the function 104, the value fields 140 corresponding to the inputs 124 and the results 138.

Figure 4:
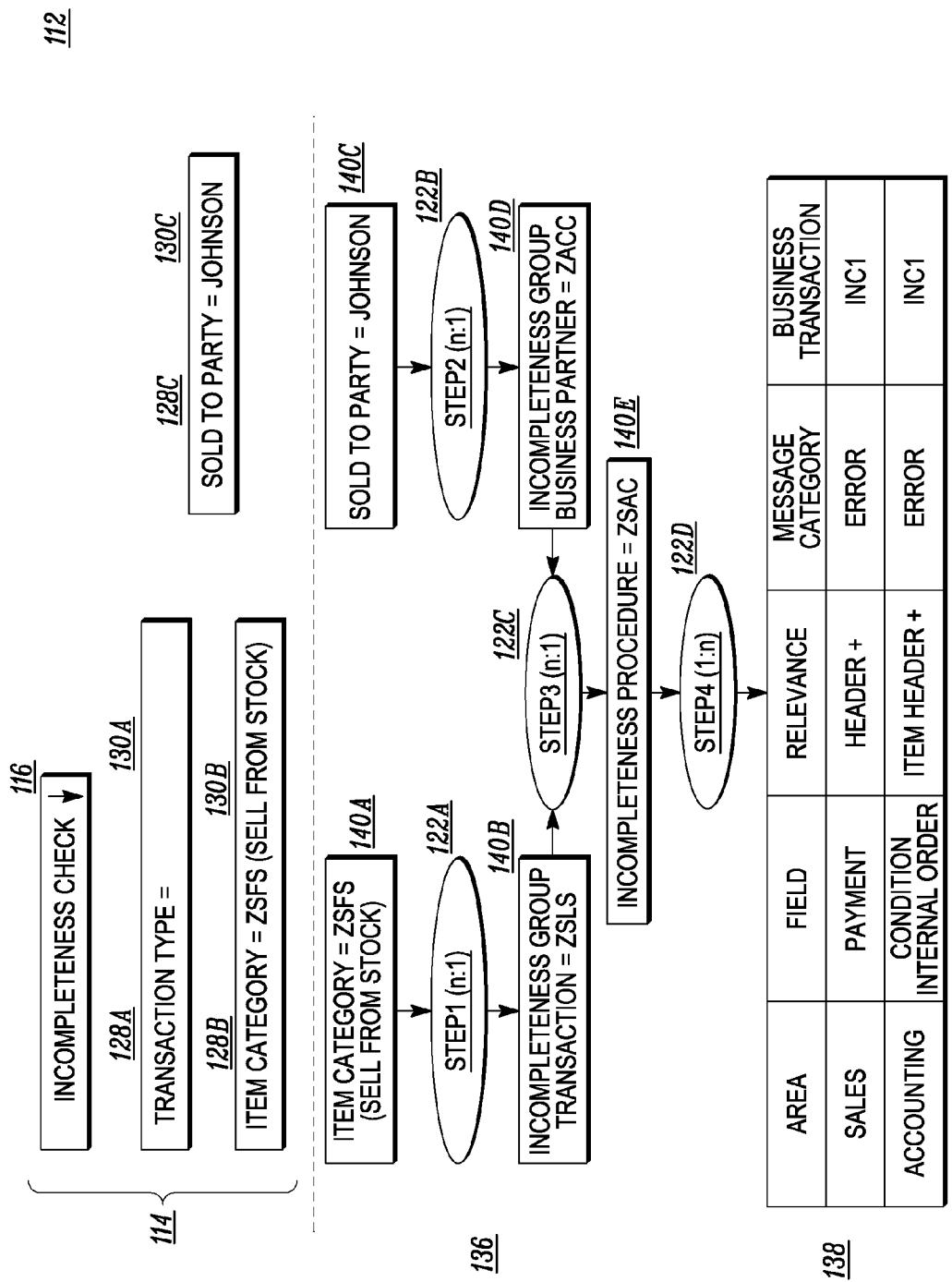
FIG. 4 is a block diagram of an example interface(s) of the system of FIG. 1, according to an example embodiment.

FIG. 4 is a block diagram of an example interface(s) 112 of the system 100, according to an example embodiment. The interface 112 of FIG. 4 may include a selection view 114. The selection view 114 includes a selection field 116 with the selected function (e.g., 104) "Incompleteness Check". The selection view 114 may also include the input fields 128A-C and corresponding values 130A-C.

The value 130A may have been left blank for the input field "transaction type" 128A. In such a case, the system 100 may provide a default value in place of any empty input fields 128, execute the function 104 with a 0 or other null value or provide the user 108 with an error when trying to execute the function 104. In other example embodiments, other manners of handling blank or empty values 130 may be provided.

The interface 112 of FIG. 4 may include a result view 136. The result view 136 may include value fields 140A-140E indicating values 130 provided as inputs 124. The value fields 140A-E, or a portion thereof, may be editable by the user 108. The result view 136 may include the steps 122A-D, which may include a cardinality (e.g., (x:y)).

The cardinality may include an indication of the input(s) and/or output(s) of data for the functional steps 122A-D. For example, a cardinality of 3:1 may indicate that there may be 3 inputs into a step 122 and 1 output from it. In other example embodiments, the cardinality 126 may include a variable, such as "n" indicating any number of inputs and/or outputs may be provided.

The result view 136 may include the results 138 which may be provided as a single result 138, or multiple results 138. As referenced above, the result view 136 may include links (e.g., 142). According to an example embodiment, the links may be embedded within the objects of the result view 136. For example, clicking on a link corresponding to step 122C may direct the user 108 to a maintenance view (e.g., 144) for that portion of the customizations 106 associated with the step 122C. Or for example, a link corresponding to one or more of the results 138 may be provided and direct the user 108 selecting the link to the associated portion of the customizations 106.

Figure 5:
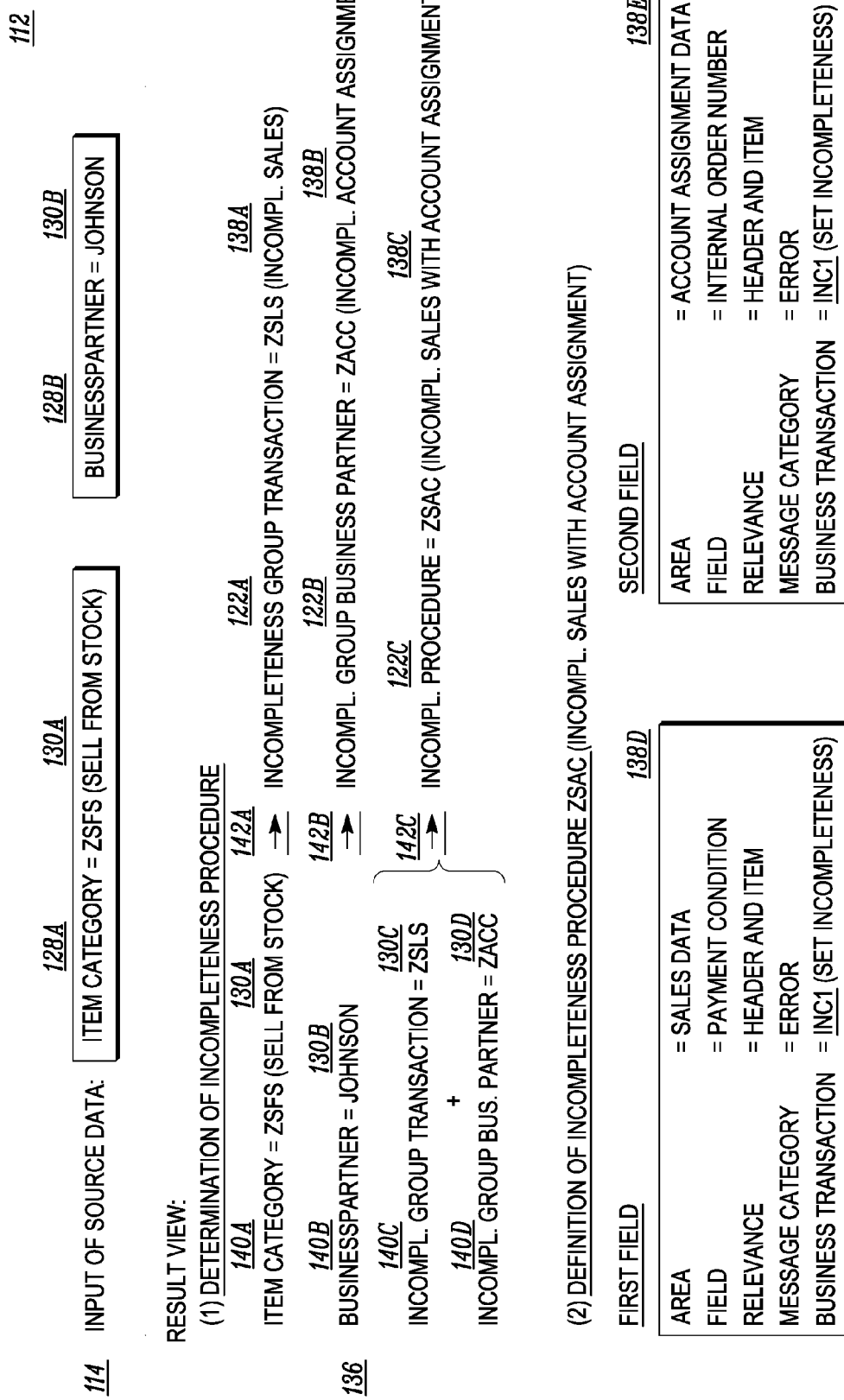
FIG. 5 is a block diagram of an example interface(s) of the system of FIG. 1, according to an example embodiment.

FIG. 5 is a block diagram of an example interface(s) of the system 100, according to an example embodiment. The interface 112 of FIG. 5 may include a selection view 114. The selection view 114 may include the input fields 128A-B and corresponding values 130A-B.

The interface 112 of FIG. 5 may include a result view 136. The result view 136 may include value fields 140A-140D indicating values 130A-D. As shown in FIG. 5, the selection view 114, may only include input fields 128A and 128B for values 130A and 130D, yet the result view 136 may also include value fields 140C and 140D and corresponding values 130C and 130D. According to an example embodiment, the values 130C and 130D may indicate values 130 determined by the system 100, but which may not have been input directly by the user 108. For example, the values 130C and 130D may have been retrieved from a database.

The result view 136 may include steps 122A-122C, corresponding links 142A-C and intermediate results 138A-138C. The result view 136 may also include final results 138D and 138E. As discussed above, though links 142A-C are explicitly shown in the example of FIG. 5, in other embodiments, the links 142 may be embedded with any of the objects displayed in the result view 136.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer system comprising:
   at least one processor;
   non-transitory computer-readable storage medium including instructions executable by the at least one processor, the instructions configured to implement,
   a selector configured to receive a selection of a function, wherein the function or a portion thereof is customized and an execution of the function yields one or more results for verification;
   an input handler configured to receive values corresponding to one or more inputs to the function;
   a step engine configured to determine a plurality of steps associated with an execution of the function including determining a cardinality associated with each step, the cardinality representing a ratio of inputs and outputs for a respective step;
   an execution engine configured to execute the function, including the plurality of steps, based on the values provided as the one or more inputs; and
   a view generator configured to provide the plurality of steps of the function in association with the values and one or more results of the execution for the verification, the view generator providing selectable links associated with one or more of the plurality of steps,
   wherein, upon selection of a selectable link, the view generator is configured to provide a maintenance view for a respective step, the maintenance view displaying customizations associated with the respective step.

2. The computer system of claim 1 further comprising a customization verifier configured to receive a customization of one or more of the plurality of steps of the function.

3. The computer system of claim 1 wherein the execution engine is configured to determine intermediate results associated with the execution of the function and the view generator is configured to provide the intermediate results in a result view.

4. The computer system of claim 1 wherein the input handler is configured to receive the one or more new values corresponding to one or more of the inputs after the view generator provides the one or more results of the execution.

5. The computer system of claim 4 wherein:
   the execution engine is configured to re-execute the function based on the one or more new values; and
   the view generator is configured to provide one or more new results associated with the re-execution of the function.

6. The computer system of claim 1 wherein the maintenance view is configured to receive a modification to the displayed customizations of the respective step.

7. The computer system of claim 1 comprising:
   the execution engine configured to determine one or more intermediate inputs during an execution of the function, and continue the execution using intermediate values provided as the intermediate inputs; and
   the input handler configured to receive the intermediate values for the intermediate inputs.

8. A method for verifying results of an execution of a function performed by one or more processors, wherein the function or a portion thereof is customized, the method comprising:
   receiving a selection of the function from a plurality of functions;
   receiving values corresponding to one or more inputs to the function;
   determining a plurality of steps associated with the execution of the function including determining a cardinality associated with each step, the cardinality representing a ratio of inputs and outputs for a respective step;
   executing the function, including the plurality of steps, based on the values provided as the one or more inputs;
   determining one or more results based on the execution of the function;

providing a result view for verifying the one or more results, the result view including the plurality of steps of the function, the values corresponding to the inputs, and the one or more results, the result view including selectable links associated with one or more of the plurality of steps; and providing a maintenance view for a respective step upon selection of a corresponding selectable link, the maintenance view displaying customizations associated with the respective step.

9. The method of claim 8 wherein the determining one or more results comprises:

determining one or more intermediate inputs associated with the function, during the execution of the function; and receiving intermediate values corresponding to the one or more intermediate inputs.

10. The method of claim 9 further comprising:

continuing the execution of the function using the intermediate values as the intermediate inputs; and providing in the result view the intermediate values corresponding to the intermediate inputs.

11. The method of claim 8 wherein the determining one or more results comprises:

determining one or more intermediate results associated with the function during the execution of the function; and providing the one or more intermediate results in the result view.

12. The method of claim 8 wherein the providing comprises:

providing the result view including the one or more results;

receiving one or more changed values corresponding to one or more of the inputs;

executing the function based on the changed values; and providing the result view including one or more new results from the executing the function based on the changed values.

13. The method of claim 8 wherein the providing comprises determining that the one or more results are different from one or more expected results.

14. The method of claim 8 further comprising:

receiving, via the maintenance view, a modification to the displayed customizations of the respective step.

15. A computer product including executable instructions stored on a non-transitory computer-readable medium that, when executed on a data processing apparatus, are configured to cause the data processing apparatus to provide an interface with multiple views, the interface comprising:

a selection view comprising:

a selection field configured to receive a selection of a function of an application, wherein the function or a portion thereof is customized and an execution of the function is configured to yield one or more results for verification, and one or more input fields corresponding to one or more inputs of the selected function and configured to receive values for the one or more inputs;

a result view comprising:

a plurality of steps associated with an execution of the function, each step including a cardinality representing a ratio of inputs and outputs, selectable links for one or more of the steps of the function, including the customization, value fields including the values corresponding to the one or more inputs, and the one or more results of the execution of the function with the values provided as the one or more inputs for verification, wherein the function, including the plurality of steps, is executed based on the values provided as the one or more inputs; and a maintenance view, provided upon a selection of one of the selectable links, configured to display customizations associated with a step corresponding to the selected link, wherein the maintenance view is configured to receive a modification to the displayed customizations.

16. The machine executable instructions of claim 15 wherein the result view comprises one or more intermediate results of the execution.

17. The machine executable instructions of claim 15 wherein the result view comprises the value fields configured to receive one or more new values to replace the values corresponding to the one or more inputs and cause a re-execution of the function with the one or more new values.

18. The machine executable instructions of claim 17 wherein the selection field is configured to receive a selection of a plurality of functions of the application.

* * * * *